US012728315B2

(12) United States Patent
Semegen et al.

(10) Patent No.: US 12,728,315 B2
(45) Date of Patent: Sep. 8, 2026

(54) SYSTEM AND METHOD FOR A QUANTITATIVE DETECTION OF A MOVEMENT

(71) Applicant: HEAVY KINEMATIC MACHINES SP. Z O. O., Komorowo (PL)

(72) Inventors: Mateusz Semegen, Komorowo (PL); Rafal Kasperowicz, Komorowo (PL); Maciej Rot, Komorowo (PL); Kacper Ostrowski, Komorowo (PL)

(73) Assignee: HEAVY KINEMATIC MACHINES SP. Z O. O., Komorowo (PL)

( * ) Notice: Subject to any disclaimer, the term of this patent is extended or adjusted under 35 U.S.C. 154(b) by 1004 days.

(21) Appl. No.: 17/786,087

(22) PCT Filed: Dec. 9, 2020

(86) PCT No.: PCT/EP2020/085382

§ 371 (c)(1),
(2) Date: Jun. 16, 2022

(87) PCT Pub. No.: WO2021/122245

PCT Pub. Date: Jun. 24, 2021

(65) Prior Publication Data

US 2022/0387853 A1 Dec. 8, 2022

(30) Foreign Application Priority Data

Dec. 16, 2019 (EP) .................................... 19461616

(51) Int. Cl.
*A63B 24/00* (2006.01)
*A63B 21/062* (2006.01)
(Continued)

(52) U.S. Cl.
CPC ...... *A63B 24/0062* (2013.01); *A63B 21/0628* (2015.10); *G01S 17/50* (2013.01);
(Continued)

(58) Field of Classification Search
USPC .......................................................... 356/141
See application file for complete search history.

(56) References Cited

U.S. PATENT DOCUMENTS 6,130,663 A * 10/2000 Null ...................... G06F 3/0346 345/158
8,860,809 B2 * 10/2014 Nordenfelt ........... G01C 15/002 348/169

(Continued)

FOREIGN PATENT DOCUMENTS

EP 0854413 A2 7/1998
EP 3542874 A1 * 9/2019 ......... A63B 24/0062
JP 2004184331 A * 7/2004

*Primary Examiner* — Helal A Algahaim
*Assistant Examiner* — Kara Richter
(74) *Attorney, Agent, or Firm* — Rivka Friedman

(57) ABSTRACT

A system for a quantitative detection of a movement. The system includes a signal emitter and two signal receivers, positioned in series, along a first axis parallel to a second axis of movement of a reflective marker provided on a moving object. The reflective marker is configured to reflect a signal emitted by the signal emitter towards the two signal receivers. The two receivers have a signal reception coverage such that allows existence of a reflective marker position, on the second axis, in which the reflective marker of a given size is recognized simultaneously by the two signal receivers.

9 Claims, 8 Drawing Sheets

(51) Int. Cl.
*G01S 17/50* (2006.01)
*G01S 17/58* (2006.01)

(52) U.S. Cl.
CPC ........... *G01S 17/58* (2013.01); *A63B 2220/20* (2013.01); *A63B 2220/30* (2013.01); *A63B 2220/801* (2013.01); *A63B 2220/805* (2013.01)

(56) References Cited

U.S. PATENT DOCUMENTS

| | | | | |
|---|---|---|---|---|
| 9,409,053 | B1 * | 8/2016 | Todd | G16H 20/30 |
| 2001/0007449 | A1 * | 7/2001 | Kobachi | G06F 3/0421 345/156 |
| 2003/0234351 | A1 | 12/2003 | Chee | |
| 2007/0213183 | A1 * | 9/2007 | Menektchiev | A63B 21/0628 482/8 |
| 2017/0254703 | A1 * | 9/2017 | Purohit | G01J 5/0025 |

* cited by examiner $$H_m \geq \frac{D_{er0} + D_{er1}}{2} \quad \text{for} \quad D_{em} \geq \frac{D_{er0}}{2 \cdot tan \frac{min(\beta_e, \alpha_{r0})}{2}}$$

$$\text{and} \quad D_{em} \geq \frac{D_{er1}}{2 \cdot tan \frac{min(\beta_e, \alpha_{r1})}{2}}$$

Fig. 5

$$H_m \geq \frac{S_{req} \cdot V_{max}}{2 \cdot F}$$

$$H_v > \frac{D_{er0} + D_{er1}}{2}$$

Fig. 6

$$D_{ee} > tan \frac{min(\alpha_{r0}, \beta_e)}{2} \cdot D_{em} + D_{er0}$$

$$D_{ee} > tan \frac{min(\alpha_{r1}, \beta_e)}{2} \cdot D_{em} + D_{er1}$$

Fig. 7

SYSTEM AND METHOD FOR A QUANTITATIVE DETECTION OF A MOVEMENT

TECHNICAL FIELD

The present invention relates to a system and method for a quantitative detection of a movement. In particular, the present invention relates to movement encoders utilizing reflective markers, properties of which are a very important factor of the system. Such encoders, often referred to as reflective encoders, are used to determine a direction and speed of movement of reflective markers attached to objects.

BACKGROUND OF THE INVENTION

Prior art defines an European patent application no. 18461537.5, in which there is disclosed a system for assisting weightlifting workout. The system uses reflective markers that they occupy only a section of a side area of a corresponding weight plate while the remaining side area of the corresponding weight plate is such that it reflects the emitted signal to a lesser extent than the reflective marker. Further, each reflective marker comprises two distinct elements: reflector A and reflector B, having different reflective properties.

Although efficient, this approach has several drawbacks. The first disadvantage is that it is more expensive to manufacture such two-part markers. The second is that using a given sensor, the two-part marker is larger than a typical one-part marker. Thirdly, a process for detecting a two-part marker is more complex and requires more hardware/software resources, especially in cases when there are gaps between objects, on which the reflective markers are positioned. Fourth, a setup process of such a system is more difficult when two-part. reflective markers are used, therefore deployment costs are relatively higher.

Additionally, a larger reflective marker limits a range of devices, in which such markers may be employed. Not all devices have sufficient space to install large markers (e.g. side area of a weight plate).

Further, the known two-part, reflective marker requires a relatively smaller distance between the sensor and the marker, while in some deployment scenarios, smaller distances may not be feasible. In the case of larger distances, a two-part, reflective marker results in gradually mixing readings based on light reflected by both reflective zones.

It would be therefore preferable to address the aforementioned drawbacks as well as to support weight plates (or other moving objects) as thin as 1 cm or thinner, which was not possible in the case of the prior art.

It would be advantageous to decrease costs associated with reflective markers while at the same time keeping required reliability of detection by a movement encoder system.

Further, it would be beneficial to provide a method for determining a minimum reflective marker size as well as minimum distance between consecutive reflective markers in the system.

The aim of the development of the present invention is a system and method for a quantitative detection of a movement in which a specific process is used to determine a minimum reflective marker size as well as minimum distance between consecutive reflective markers.

SUMMARY AND OBJECTS OF THE PRESENT INVENTION

An object of the present invention is a system for a quantitative detection of a movement, the system comprising: a signal emitter and two signal receivers, positioned in series, along a first axis parallel to a second axis of movement of a reflective marker (M), provided on a moving object, wherein the reflective marker (M) is configured to reflect the signal emitted by the emitter towards the receivers; the system being characterized in that the two receivers have a signal reception coverage such that allows existence of a reflective marker (M) position, on the second axis, in which the reflective marker (M) of a given size is recognized simultaneously by the two receivers.

Preferably, the size $H_m$ of the reflective marker in the second axis is calculated as a function of: a distance $D_{em}$ between the first and the second axes; a distance $D_{er0}$ between the emitter and the first receiver; a distance $D_{er1}$ between the emitter and the second receiver; a signal emitting angle $\beta_e$ of the emitter; a signal reception angle $\alpha_{r0}$ of the first receiver; and a signal reception angle $\alpha_{r1}$ of the second receiver. Preferably, $$H_m \geq \frac{D_{er0} + D_{er1}}{2} \text{ for } D_{em} \geq \frac{D_{er0}}{2 \cdot \tan\frac{\min(\beta_e, \alpha_{r0})}{2}} \text{ and}$$

$$D_{em} \geq \frac{D_{er1}}{2 \cdot \tan\frac{\min(\beta_e, \alpha_{r1})}{2}}$$

Preferably, the size $H_m$ of the reflective marker in the second axis, as well as a distance between the reflective markers, are further calculated as a function of:

$$H_m \geq \frac{S_{req} \cdot V_{max}}{2 \cdot F}$$

$$H_v > \frac{D_{er0} + D_{er1}}{2}$$

wherein: F—sampling frequency;

$V_{max}$—maximum speed of movement of the reflective markers;

$S_{req}$—a number of samples required to detect a direction of movement; and $H_v$—a distance between the reflective markers.

Preferably, the $D_{er0}$ and $D_{er1}$ are equal.

Preferably, the $\alpha_{r0}$ and $\alpha_{r1}$ are equal.

Preferably, a distance $D_{ee}$ between emitters calculated as:

$$D_{ee} \geq \tan\frac{\min(\alpha_{r0}, \beta_e)}{2} \cdot D_{em} + D_{er0}$$

$$D_{ee} \geq \tan\frac{\min(\alpha_{r1}, \beta_e)}{2} \cdot D_{em} + D_{er1}$$

Preferably, at said position, when the signals reported by said two signal receivers are the same, their waveforms cross while their respective values are at more than 25% of the maximum value reported for the reflective marker.

Another object of the present invention is a weightlifting system comprising a weigh stack having at least one weight plate, characterized in that it comprises the system according to the present invention wherein the reflective marker in affixed to at least one weight plate.

A further object of the present invention is a method for determining a direction of movement in the system according to claim 1, the method comprising the step of: determining that both signals from the two receivers have a predefined Low value (T1); determining that one of the signals has assumed a predefined High value while the other signal has maintained said Low value (T2); subsequently, checking whether the respective signals have assumed the values of the other signal at (T2) thereby reversing the values of the signals (T3); checking whether both signals have the Low level again (T5); determining a direction of movement, of said reflective marker, based on the first and the last signal having said High level.

Preferably, the method further comprises the steps of: estimating a value ($W_{tr}$) of the signals at a time (T3) when the signals values cross; determining a maximum value ($W_{max}$) registered by the receivers and if $$\frac{W_{tr}}{W_{max}} \geq$$

threshold then a accepting a pass of the reflective marker by the system.

Another object of the present invention is a computer program comprising program code means for performing all the steps of the computer-implemented method according to the present invention when said program is run on a computer.

Another object of the present invention is a computer readable medium storing computer-executable instructions performing all the steps of the computer-implemented method according to the present invention when executed on a computer.

BRIEF DESCRIPTION OF THE DRAWINGS

These and other objects of the invention presented herein, are accomplished by providing a system and method for a quantitative detection of a movement. Further details and features of the present invention, its nature and various advantages will become more apparent from the following detailed description of the preferred embodiments shown in a drawing, in which:

FIG. 5 presents equations allowing to determine a minimum size of a reflective marker in an axis of movement;

FIG. 6 presents equations used in order to complement the equations of FIG. 5 in order to determine a minimum size of a reflective marker in an axis of movement;

FIG. 7 presents equations applied to calculate a distance between the emitters when the system utilizes a plurality of sensors positioned in the axis parallel to the axis of movement.

NOTATION AND NOMENCLATURE

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

A computer-readable (storage) medium, such as referred to herein, typically may be non-transitory and/or comprise a non-transitory device. In this context, a non-transitory storage medium may include a device that may be tangible, meaning that the device has a concrete physical form, although the device may change its physical state. Thus, for example, non-transitory refers to a device remaining tangible despite a change in state.

As utilized herein, the term "example" means serving as a non-limiting example, instance, or illustration. As utilized herein, the terms "for example" and "e.g." introduce a list of one or more non-limiting examples, instances, or illustrations.

DESCRIPTION OF EMBODIMENTS

Figure 1A:
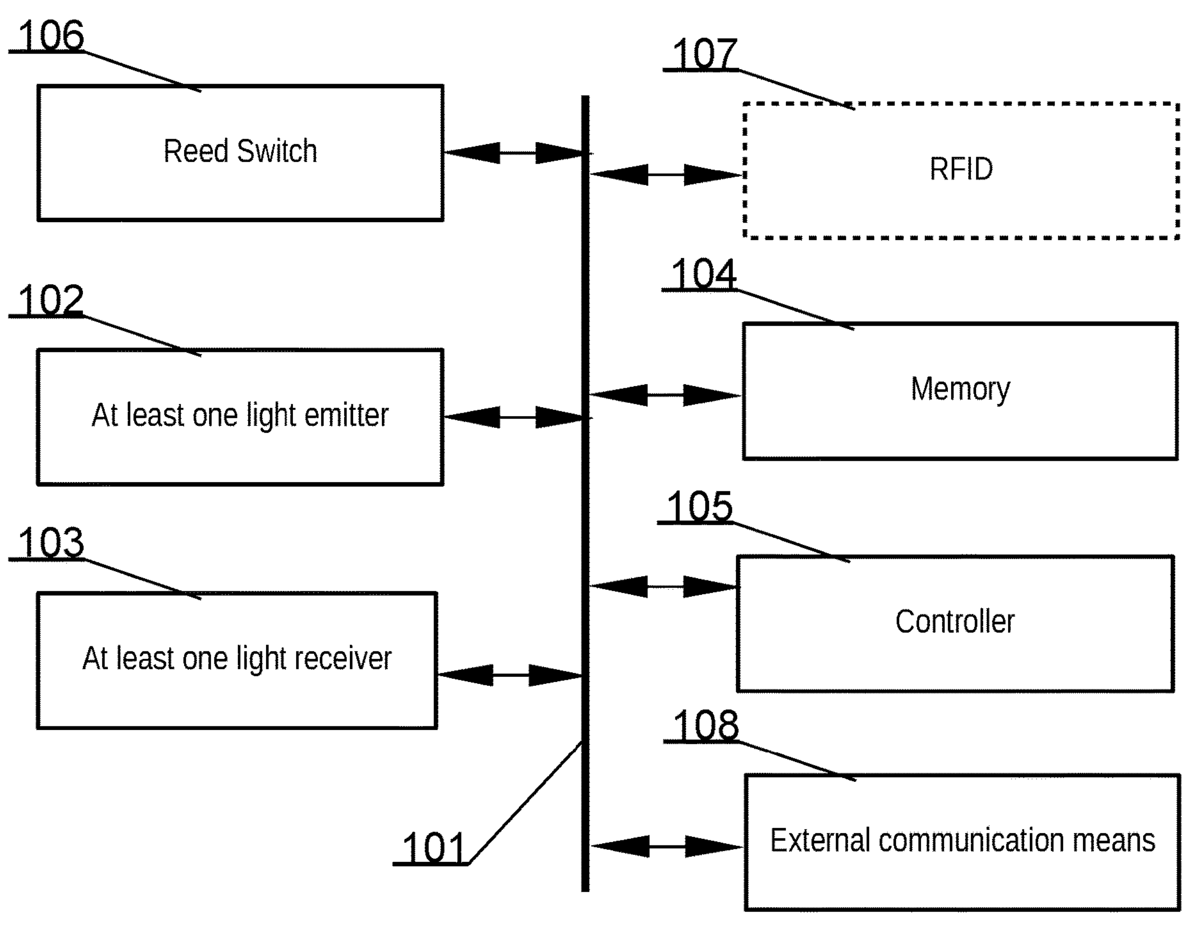
FIG. 1A presents a diagram of the system according to the present invention.

FIG. 1A presents a diagram of a system implementing the movement detection according to the present invention. The system is a set of modules aimed at monitoring workout activities on a weight stack system.

Such system is exemplary only for employing the movement encoder according to the present invention. Quantitative detection of movement and direction is a common feature of a so-called smart weight stack system.

The electronic system may be realized using dedicated components or custom made FPGA or ASIC circuits. The system comprises a system bus (101) communicatively coupled to a memory (104). Additionally, other components of the system are communicatively coupled to the system bus (101) so that they may be managed by a controller (105). It will be evident that instead of a system bus (101) separate electrical connections may be used.

The memory (104) may store computer program or programs executed by the controller (105) in order to execute steps of the method according to the present invention. The memory (104) may store any configuration parameters of the system.

An external communication means (108) may be used in order to update operating instructions of the controller (105) as well as in order to communicate workout parameters and statistics to external devices, for example in the Internet. Such external communication means (108) may be, but are not limited to, Bluetooth® Low Energy (BLE) or Wi-Fi wireless interfaces.

A proximity sensor (107) such as an RFID sensor, may be used in order to identify particular users operating the system. Such user may be identified using a smartphone comprising an RFID functionality or a suitable workout garment, such as a glove, comprising an RFID functionality configured to identify a particular user.

The system may also comprise several modules positioned on the workout equipment such as on a weight-stack.

These modules may comprise at least one reed switch (106) (or a similar contact/proximity sensor such as a Hall effect sensor) providing operating current when two contacts are in proximity or directly connect to one another). Typically, a magnet will be used to activate the reed-switch. The function of such reed switch (106) is two-fold, first it may indicate a low power mode when such switch has not been activated for a longer period of time (a predefined time, e.g. 3 minutes), secondly such reed-switch may identify the first weight plate of a given weight stack.

According to the present invention, the system comprises at least one emitter/receiver pair (102, 103). Preferably, the at least one emitter is a light emitter (102) while the corresponding receiver (103), comprising a pair of receivers, is configured to conditionally receive a signal from the corresponding emitter (102).

Said conditional reception requires a presence of an appropriate reflective marker as will be explained later. Thus, in a preferred embodiment each emitter (102) emits a signal in a given axis, for example horizontally or vertically, depending on the positioning of weight plates (direction of movement).

Each emitter (102) is configured to emit a signal detectable by the receiver (103), such as a beam of visible light, although other signals, such as radio signals and infrared signals may be used.

In a preferred embodiment, the emitter (103) is an infrared diode while the receiver (102) is a photo-transistor.

As will become evident, from the subsequent figures, the at least one emitter/receiver pair (102, 103) is positioned on one side of the workout equipment. Therefore, each weight plate comprises a reflective marker configured to reflect said detectable signal of the emitter (102) and reflect it towards the receiver (103).

In a more general embodiment, said reflective marker is positioned on an object, movement of which is monitored. Other possible objects, in addition to weight plates, for carrying the aforementioned reflective markers are for example: (1) Automated Guided Vehicles and reflective markers positioned along routes; (2) conveyor belts of different types having reflective markers thereon; (3) control of movement and positioning of devices such as doors of lifts having reflective markers thereon.

In some implementations, reflective markers are more broadly referred to as coding elements. In the case of reflective encoders, a rotary/linear motion of an object being monitored is converted to equivalent light pattern via a use of a codewheel or a codestrip or a sequence of reflective coding elements.

As is evident from FIG. 1A, the system may operate using just a single emitter/receiver pair (102, 103). However, embodiment with several emitter/receiver pairs (102, 103) are also possible as will be shown in the following parts of the specification.

Figure 1B:
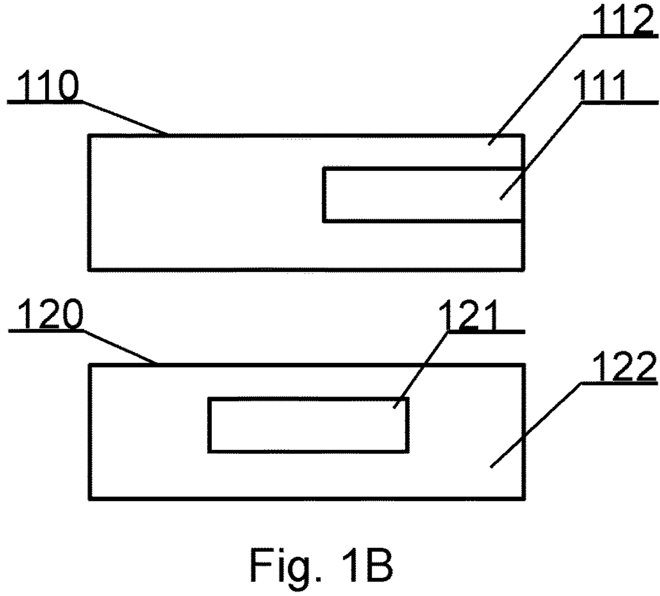
FIG. 1B depicts examples of reflective markers according to the present invention.

Said reflective markers (111, 121) are preferably such that they occupy only a section of the side area of a corresponding weight plate (as shown in FIG. 1B) while the remaining side area of a corresponding weight plate (110, 120) is preferably matte (112, 122) and reflects the emitted signal to a much lesser extent than the reflective marker.

When a weight plate, having said reflective marker (111, 121) thereon, has passed by the photo-transistor (receiver), it will register a change in the properties of received signal (light) from a given state to another state. Naturally, there may be set different thresholds for a high and low state.

Reflectors reflect light to such an extent that it is possible to differentiate between said reflectors and the weight plate as well as between a situation where an empty space, between weight plates, is present in front of a receiver (103).

With reference to reflective parameters of the reflective markers (111, 121), it is most convenient to use a range of values provided by an analog to digital converter (ADC) responsible for converting signals received from the respective sensors.

In case of a 12-bit ADC the range is (0-4095). For the weight plate (when a typical matte, dark color is used e.g. black), the returned values are usually below 2000. Reflectors (111, 121) usually return values in a range of over 2000.

Particular values and ranges above depend on the ADC's resolution. A 0 denotes black while a maximum value denotes white. For example, a 14—bit ADC will have a range of 0 to 16383 and the respective values of a 12-bit ADC will shift proportionally x4.

It is clear, to one skilled in the art, that the respective reflective properties may be defined in different ranges as long as it is possible to clearly differentiate between the weight plate and the reflectors (111, 121).

Figure 2:
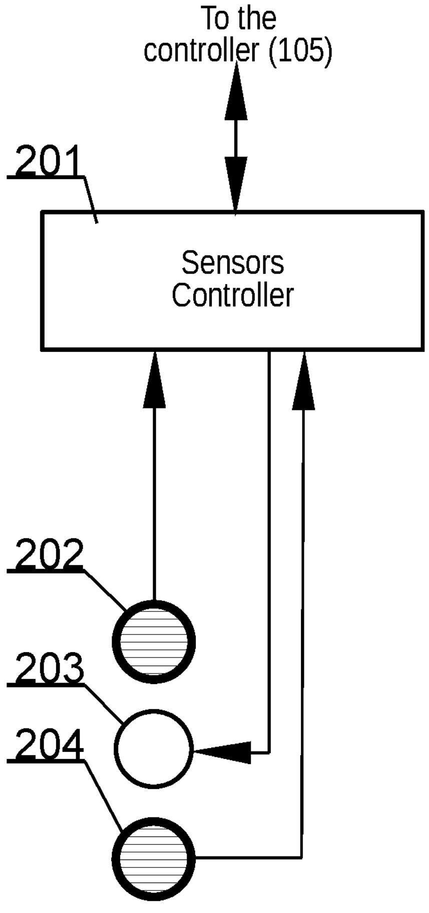
FIG. 2 presents an example of a combined emitter/receiver pair.

FIG. 2 presents an example of a combined emitter/receiver pair (102, 103). In this embodiment, an integrated sensor comprises an emitter (203) typically being an infrared LED as well as two receivers (202, 204) positioned on a single axis, typically a vertical axis.

The single axis is the axis of movement, i.e. in case of a vertical movement (the Y axis) the X and Z coordinates of the emitters and the receivers (102, 103) are constant, while in case of a horizontal movement (the X axis) the Y and Z coordinates of the emitters and the receivers (102, 103) are constant.

Typically, the two receivers (202, 204) will be the same, however an embodiment with different receivers (202, 204) is also possible but more difficult to manage by the controller (105).

The receivers (202, 204) are configured to register the reflected light emitted by the emitter (203).

Additional electrical and/or digital components such as transistors and resistors required by said emitter (203) and receivers (202, 204) may be integrated in a form of a sensor controller (201) being controlled by and reporting to the main controller (105).

The sensor controller (201) may report direction of detected movement (e.g. up, down, not present) as well as a speed of movement and preferably a corresponding time stamp.

Now that the sensors arrangement has been presented, their method of operation will be described in details. The sensors, as well as their appropriate placement allow for proper detection of the weight plates (having the reflective markers thereon) as well as their direction of movement.

Data from a photo-transistor receiver (103, 202, 204) are typically in a form of a stream of numerical values (after being converted by an analog to digital converter preferably being a part of the controller (105)).

Thus, in order to reliably detect a direction of movement, two receivers are used (202, 204), which will detect a given reflective markers at different times.

An additional signal range, taken into account while detecting a marker, is a range defining the weight plate without a marker. Typically, this range falls between 0 and 650 (12-bit ADC), because the weight plates are usually painted with black or other dark color (clearly, other definitions of such range are possible).

In this setup of such system, it is very important to determine a minimum size of the reflective marker as well as a minimum distance between consecutive reflective markers.

This determination requires signal emission angle of the emitter (203), signal reception angles of the receivers (202, 204), a distance between the receivers (202, 204) and the emitter (203), a distance between the receivers (202, 204) and the reflective markers, a sampling frequency of the receivers (202, 204).

FIG. 3A-F present different states of signals depending on a position of a reflective marker determined according to the present invention.

A preferred behavior of the system is such that, during a movement of a reflective marker along its axis of movement (211) parallel to the axis of the sensors (212), there is a period of time when both receivers (202, 204) detect the reflective marker. Such situation has been depicted in FIGS. 3A-F.

Figures 3A, 3B:
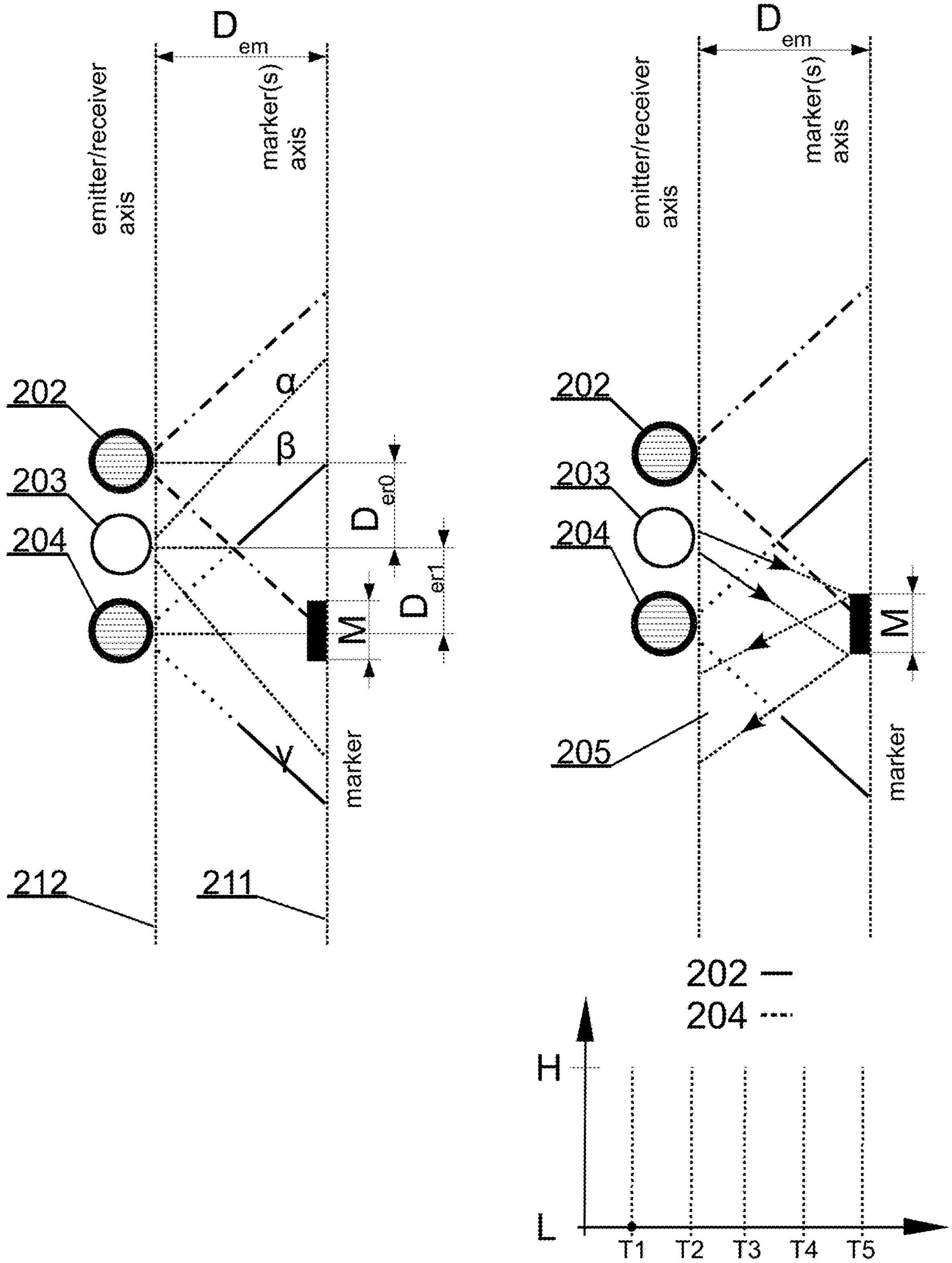
FIG. 3A-F present different states of signals depending on a position of a reflective marker determined according to the present invention.

FIG. 3A presents a setup where the emitter (203) and the receivers (202, 204) are positioned, in series, along an axis (212) parallel to an axis of movement (211) of a reflective marker (M). A distance between these parallel axes is ($D_{em}$). A distance between the emitter (203) and the receiver (202) is ($D_{er0}$) while a distance between the emitter (203) and the receiver (203) is ($D_{er1}$). A signal emitting angle of the emitter (203) is β while a signal reception angle of the receiver (202) is a and a signal reception angle of the receiver (204) is γ.

FIG. 3B shows the system state at time T1, where the marker (M) starts to move towards the sensor and the receivers (202, 203) do not pick up any signal from the reflective marker, because the signal emitted (203) is not reflected towards them (205).

Figures 3C, 3D:
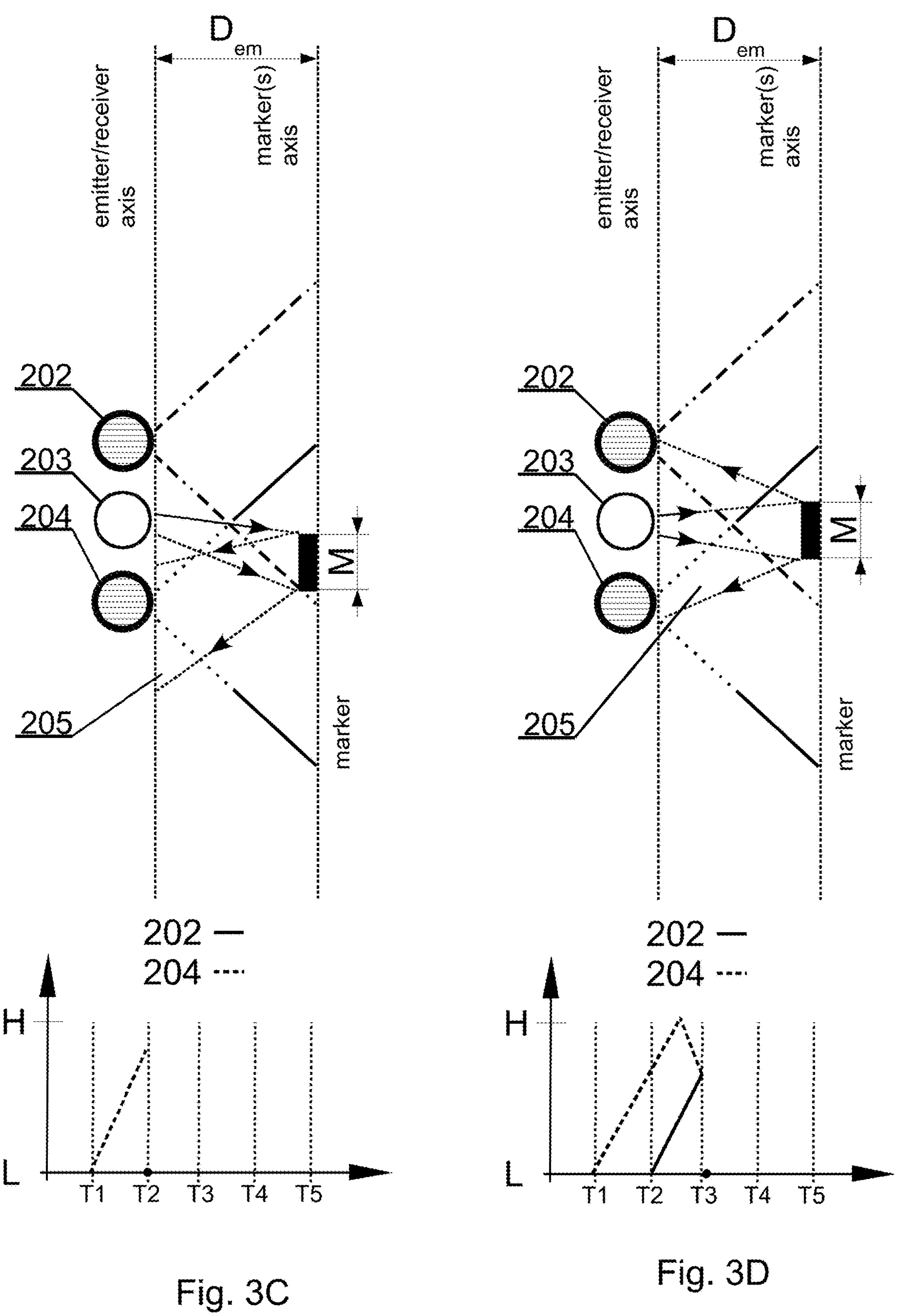

In FIG. 3C the reflective marker (M) reflects the light only towards reflector (204) and the value reported is High or close to High. The High (H) value may correspond to a maximum value or to a value above a given threshold. Similarly, Low (L) value may correspond to a minimum value or to a value below a given threshold. Therefore, (H) level is presented on the graph at time T2.

FIG. 3D depicts the reflective marker (M) approximately at a position of the emitter (203). Therefore, signals from the receivers (202, 204) have very similar values at time T3.

Figures 3E, 3F:
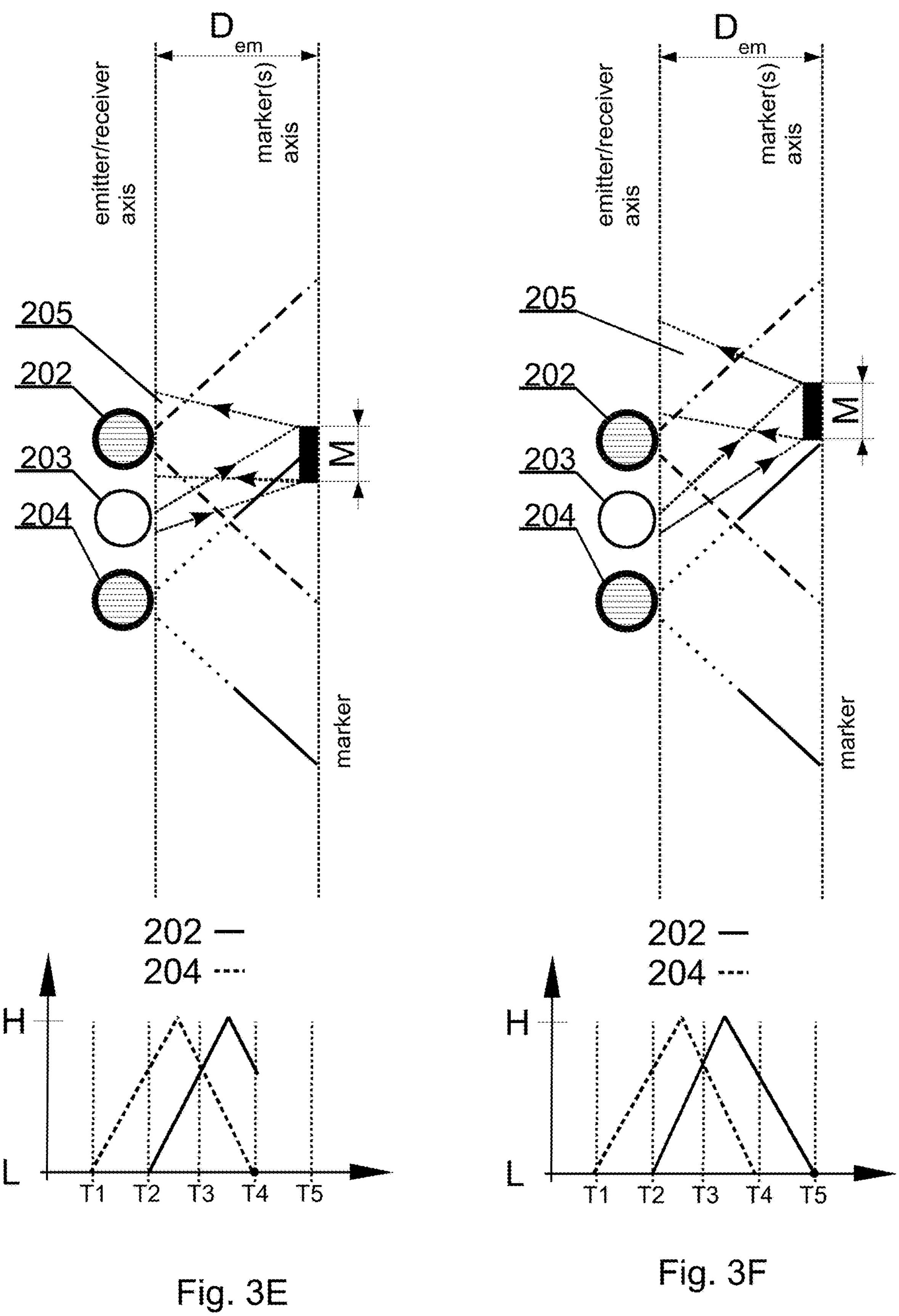

Next, in FIG. 3E, at time T4 the reflective marker (M) passes the receiver (202) and its corresponding signal value starts to decrease. A value of a signal corresponding to the receiver (204) is close to (L—Low) as the reflective marker (M) is well past the receiver (204).

At FIG. 3F the reflective marker (M) has passed the receiver (202) and the values of signals of both receivers are at the L level.

Figure 4A:
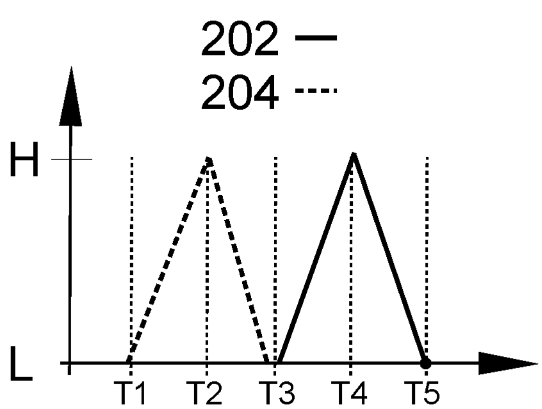
FIGS. 4A-C show waveforms presenting signals when a marker is too small or a marker changes direction of movement.

In case the size of the marker (M) is too small, the signals will be fully separate i.e. will not cross at time T3 as shown in FIG. 4A. In such a case, it is not possible to recognize, in which direction a reflective marker moves.

In case of a too small reflective marker an uncertainty presents itself when a given marker after T2 position returns to T1 position instead of proceeding to T3 position (in other words the direction of movement is switched) and then another marker above it, will generate a signal on the receiver (202). From a perspective of a return signal analyzer, the response would be the same as in the case of a typical upwards movement.

To put it differently, the present invention makes a requirement that both receivers (202, 204) have a coverage such that allows existence of a reflective marker position, on its axis of movement (211), in which a given reflective marker (M) of a given size is recognized simultaneously by both receivers (202, 204). Additionally, given that requirement, the present invention provides a method for determining a minimum size of a reflective marker when that condition is met.

Figure 4B:
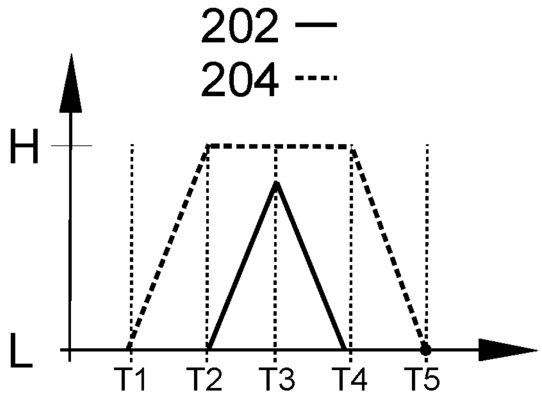
Figure 4C:
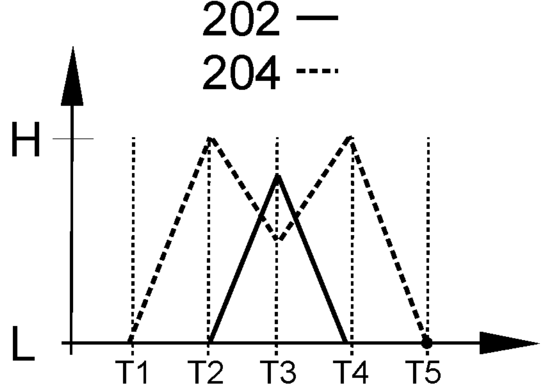

Owing to such an arrangement, when a reflective marker changes its direction of movement while being in proximity to the sensor, the resulting waveform may assume two shapes as shown in FIGS. 4B-C. The shapes depend on how far the reflective marker has moved towards the emitter of a given sensor.

FIG. 5 presents equations allowing to determine a minimum size of a reflective marker in an axis of movement. To this end, two equations are present in case a distance between the emitter (203) and the first receiver (202) is different that a distance between the emitter (202) and the second receiver (204). The parameters of the equations are as follows:

- $D_{er0}$—a distance between the emitter (203) and the first receiver (202) in an axis parallel (212) to the axis of movement (211) of the reflective marker;
- $D_{er1}$—a distance between the emitter (203) and the second receiver (204) in an axis parallel (212) to the axis of movement (211) of the reflective marker;
- $\alpha_{r0}$—a reception angle of the first receiver (202) in an axis perpendicular to the axis of movement (211) of the reflective marker;
- $\alpha_{r1}$—a reception angle of the second receiver (204) in an axis perpendicular to the axis of movement (211) of the reflective marker;
- $\beta_e$—an emission angle of the emitter (203) in an axis perpendicular to the axis of movement (211) of the reflective marker;
- $H_m$—a minimum size of a reflective marker in an axis of movement (211);
- $D_{em}$—a distance between the axis of movement (211) of the reflective marker to the parallel axis (212) of the emitter/receivers.

Usually, the angles $\alpha_{r0}$, $\alpha_{r1}$ and $\beta_e$ form a shape of a cone or cone-like coverage area (emission or reception respectively) in a three-dimensional space.

The size of the reflective marker in the axis perpendicular to the axis of movement (211) may be chosen more freely and will typically equal or similar to the $H_m$ size as having a larger size is inefficient while having a smaller size is possible but not preferred.

The maximum size of a reflective marker in an axis of movement is not that important as long as the $H_m$, $H_v$ and $D_{ee}$ are applied. The system will work properly with any size. Nevertheless, the a shorter marker, meeting the minimum size constraint will always be preferred.

In case $D_{er0}$ is different from $D_{er1}$ it is preferred to choose the least favorable value i.e. the greater one of the two and use it in the remaining calculations.

This is the first part of determining a minimum reflective marker size in the axis of movement (211). The other part relates to sampling frequency as well as maximum speed of movement of the reflective markers.

FIG. 6 presents equations used in order to complement the equations of FIG. 5 in order to determine a minimum size of a reflective marker in an axis of movement (211). These parameters are used optionally in addition to the calculations shown in FIG. 5.

The parameters of the equations are as follows:

F—sampling frequency;

$V_{max}$—maximum speed of movement of the reflective markers;

$S_{req}$—a number of samples required to detect a direction of movement; this parameter is related to a number of states that must be detected in order to determine a direction of movement. This aspect will be presented in more details in the remaining part of the specification;

$H_v$—a distance between the reflective markers.

FIG. 7 presents equations applied to calculate minimum a distance between the emitters when the system utilizes a plurality of sensors positioned in the axis parallel (212) to the axis of movement (211). As the distance between the emitters increases, the system looses precision i.e. changes are reported less frequently.

The parameters of the equations are as follows:

$D_{ee}$—a distance between emitters calculated for both receivers (202, 204) separately; In case the distance is the same, only one equation is sufficient. In case $D_{ee}$ for $D_{er1}$ is different from $D_{ee}$ for $D_{er0}$ it is preferred to choose the least favorable value i.e. the greater one of the two and use it in the remaining calculations.

When $$H_m < \frac{D_{er0} + D_{er1}}{2}$$

the waveform has a shape as shown in FIG. 4A. Whereas if the size of the reflective marker is greater, the waveform has a shape as shown in FIGS. 3B-F, which guarantees that there exists a point in time (T3, FIG. 3D) when a reflective marker (M) is recognized simultaneously by both receivers (202, 204). If $H_m$ is too small, it is impossible to determine a direction of movement of a reflective marker in particular when there is a plurality of reflective markers positioned on the axis of movement (211).

Figure 8:
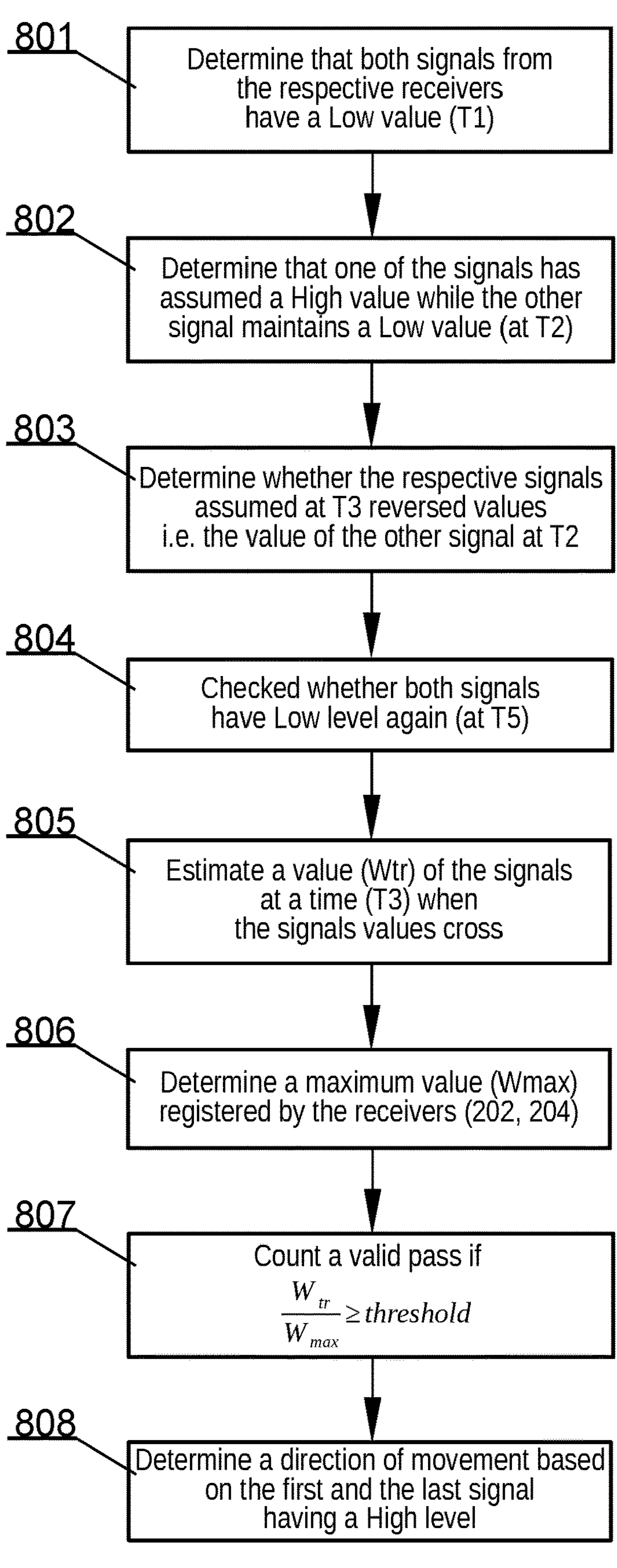
FIG. 8 presents a method for determining a direction of movement based on the reflective encoder and the reflective marker according to the present invention.

FIG. 8 presents a method for determining a direction of movement based on the reflective encoder and the reflective marker according to the present invention. This is possible based on readings of signals from the two receivers (202, 204), which signals have waveform as shown in FIG. 3F.

There are distinguished four states, which form a sequence. At step (801) it is determined that both signals from the respective receivers (202, 204) have a Low value (T1). This may be considered a state (A). Subsequently, at step (802), one of the signals assumes a High value while the other signal maintains a Low value, which is present at time T2 and may be considered a state (B). Next, at step (803), is is checked whether the respective signals assume reversed values i.e. the value of the other signal at T2. This happens at T3, which is considered a state (C). Step (803) may be executed more than once. Lastly, at step (804) it is checked whether both signals have Low level again (at T5), which is considered a state (D).

After a sequence A-D has been detected, the method estimates (805) a value ($W_{tr}$) of the signals at a time (T3) when the signals values cross (i.e. have the same or substantially the same value) based on the closest sampled values of said signals at T3.

Further, during the sequence (801-803) there is determined (806) a maximum value ($W_{max}$) registered by the receivers (202, 204). If $$\frac{W_{tr}}{W_{max}} \geq$$

threshold then a pass or the reflective marker is counted (807) by the system i.e. is valid.

The above threshold functions as a way of eliminating noise such as external signal interferences of other ambient reflections of light. Additionally, an area on which reflective markers are fixed, may also be uneven in terms of signal reflection. Such noise levels are usually low and may be cut off using such a threshold approach.

At the time (T3) when the signals values cross the preferred level at which the signals cross is preferably more than 25% of the maximum value reported for a given reflective marker, while higher values are preferred.

A direction of movement is determined (808) by the first and the last signal having a High level, such that:

| | | Last H signal | |
|---|---|---|---|
| | Receiver | Following in the main direction of movement | Preceding in the main direction of movement |
| First H signal | Following in the main direction of movement | Return towards the main direction of movement | Movement against the main direction of movement |
| | Preceding in the main direction of movement | Movement along the main direction of movement | Return against the main direction of movement |

The following and preceding receivers (202, 204) are determined based on the main direction of movement (for example in case of weight stacks, the main direction of movement is vertical and upwards from a resting position) and their positioning with respect to the emitter (203).

For example, assuming that the axis of movement (211) is vertical and upwards, the receiver "Following in the main direction of movement" is the upper receiver while the receiver "Preceding in the main direction of movement" is the lower receiver of a sensor. When a first H signal is registered by the lower receiver and the last H signal is registered by the upper receiver, then there is present a "Movement along the main direction of movement" i.e. a vertical movement upwards.

In another scenario, assuming that the axis of movement (211) is horizontal and towards left, the receiver "Following in the main direction of movement" is the left receiver while the receiver "Preceding in the main direction of movement" is the right receiver of a sensor. When a first H signal is registered by the left receiver and the last H signal is registered by the right receiver, then there is present a "Movement against the main direction of movement" i.e. a horizontal movement towards the right side.

A speed of movement of the reflective marker may be calculated based on a duration of the sequence of states A-D. A distance traveled by the marker, in that time T5-T1, is $2 \cdot H_m$.

Additionally, there is possible speed estimation based on measuring time between registering consecutive markers at a single sensor. This may provide a quicker determination of speed in cases when markers are positioned more frequently than the sensors.

By having a set of sensors according to FIG. 2 and reflective makers configured according to FIGS. 3-8, a position may also be estimated. The more the sensors and reflective markers the better the precision of position estimation.

To this end, having a single sensor and a single reflective marker (one may obtain information on whether the reflective marker is present before or after the sensor along the respective axis of movement (211). In case of multiple sensors and reflective markers the system may count how many reflective markers have passed the respective sensors and based on that the system may estimate position with accuracy limited to the distance between the sensors ($D_{ee}$) or with an accuracy equal to a distance between the reflective markers ($H_v$).

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system".

Furthermore, the present invention may take the form of a computer program product embodied in any tangible medium of expression having computer usable program code embodied in the medium.

It can be easily recognized, by one skilled in the art, that the aforementioned method for a quantitative detection of a movement may be performed and/or controlled by one or more computer programs. Such computer programs are typically executed by utilizing the computing resources in a computing device. Applications are stored on a non-transitory medium. An example of a non-transitory medium is a non-volatile memory, for example a flash memory while an example of a volatile memory is RAM. The computer instructions are executed by a processor. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:

1. A system for a quantitative detection of a movement, the system comprising:

a signal emitter and two signal receivers, positioned in series, along a first axis parallel to a second axis of movement of a reflective marker provided on a moving object, wherein the reflective marker is configured to reflect a signal emitted by the signal emitter towards the two signal receivers;

wherein the two receivers have a signal reception coverage such that allows existence of a reflective marker position, on the second axis, in which the reflective marker of a given size is recognized simultaneously by the two signal receivers;

wherein the size $H_m$ of the reflective marker in the second axis is calculated as a function of:

a distance $D_{em}$ between the first axis and the second axis, a distance $D_{er0}$ between the signal emitter and the first signal receiver, a distance $D_{er1}$ between the signal emitter and the second signal receiver, a signal emitting angle $\beta_e$ of the signal emitter, a signal reception angle $\alpha_{r0}$ of the first signal receiver, and a signal reception angle $\alpha_{r1}$ of the second signal receiver;

and wherein:

$$H_m \geq \frac{D_{er0} + D_{er1}}{2} \text{ for } D_{em} \geq \frac{D_{er0}}{2 \cdot \tan\frac{\min(\beta_e, \alpha_{r0})}{2}} \text{ and}$$

$$D_{em} \geq \frac{D_{er1}}{2 \cdot \tan\frac{\min(\beta_e, \alpha_{r1})}{2}}$$

whereas when $D_{er0}$ is different from $D_{er1}$, the greater one of the two is applied to determine $D_{em}$.

2. The system according to claim 1 wherein the distance ($D_{er0}$) between the signal emitter and the first signal receiver is equal to the distance ($D_{er1}$) between the signal emitter and the second signal receiver.

3. The system according to claim 1 wherein the signal reception angle ($\alpha_{r0}$) of the first signal receiver is equal to the signal reception angle ($\alpha_{r1}$) of the second signal receiver.

4. The system according to claim 1 wherein at a position wherein the signals reported by said two signal receivers are the same, their waveforms cross while their respective values are at more than 25% of a maximum value reported for the reflective marker.

5. A weightlifting system comprising a weight stack having at least one weight plate comprising the system according to claim 1 wherein the reflective marker in affixed to the at least one weight plate.

6. A method for determining a direction of movement in the system of claim 1, the method comprising:

determining that both signals from the two signal receivers have a predefined Low value (T1);

determining that one of the signals has assumed a predefined High value while the other signal has maintained said Low value (T2);

subsequently, checking whether the respective signals have assumed the values of the other signal at (T2) thereby reversing the values of the signals (T3);

checking whether both signals have the Low level again (T5);

determining a direction of movement, of said reflective marker, based on the first and the last signal having said High level.

7. The method according to claim 6 further comprising:

estimating a value ($W_{tr}$) of the signals at a time (T3) when the signals values cross;

determining a maximum value ($W_{max}$) registered by the signal receivers and if $$\frac{W_{tr}}{W_{max}} \geq \text{threshold}$$

then accepting a pass of the reflective marker by the system.

8. A computer program comprising program code means for performing all the steps of the method of claim 6 when said program is run on a computer.

9. A computer readable medium storing computer-executable instructions performing all the steps of the method of claim 6 when executed on a computer.

* * * * *